A. J. CROSS.
MULTIPLE FOCUS LENS.
APPLICATION FILED APR. 24, 1914.
1,106,629.
Patented Aug. 11, 1914.
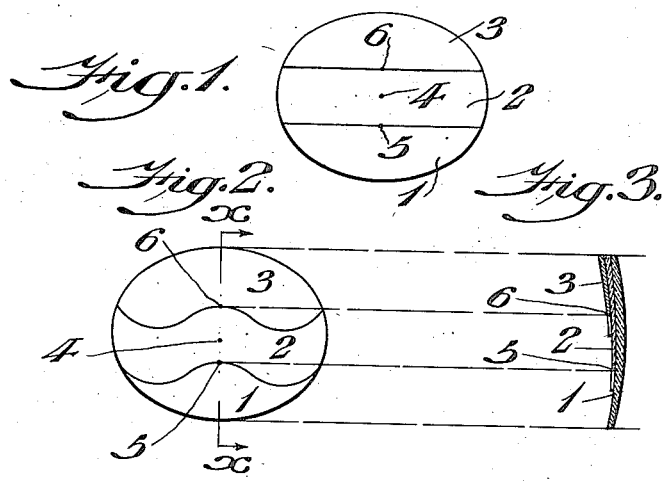
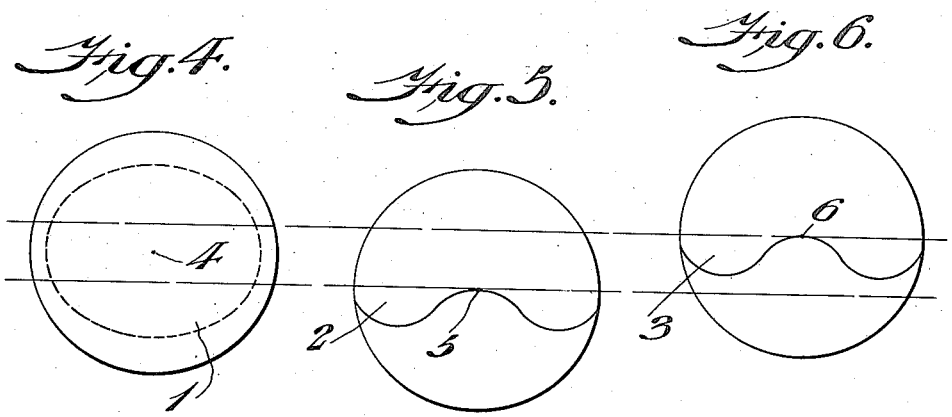
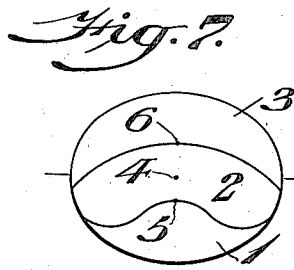
WITNESSES
H. E. Dieterich
P. F. Nagle.
INVENTOR
Andrew Jay Cross.
BY Wiedersheim & Fairbanks,
ATTORNEYS

UNITED STATES PATENT OFFICE.

ANDREW JAY CROSS, OF NEW YORK, N. Y.

MULTIPLE-FOCUS LENS.

1,106,629.  Specification of Letters Patent.  Patented Aug. 11, 1914.

Application filed April 24, 1914. Serial No. 834,108.

*To all whom it may concern:*

Be it known that I, ANDREW JAY CROSS, a citizen of the United States, residing in the city and county of New York, State of New York, have invented a new and useful Multiple-Focus Lens, of which the following is a specification.

My invention relates to a new and useful improvement in multiple focal lenses and consists in providing means for preventing the doubling of an object during the change in vision from one focal area to another.

It further consists of a plurality of lens members, in which the minor member has its principal axis located approximately at the inner junction edge of the other member and decentric to the principal axis of said other member.

It further consists in placing the principal axis of the minor member approximately at the inner junction edge and approximately at the central vertical meridian and decentric to the principal axis of the other member.

It further consists of other novel features of construction, all as will be hereinafter fully set forth.

For the purpose of illustrating my invention, I have shown in the accompanying drawings one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figures 1 and 2 represent front elevations of lenses, embodying my invention, showing different forms which may be employed. Fig. 3 represents a vertical sectional view on line x—x of Fig. 2. Figs. 4, 5 and 6 represent elevations showing the lenses employed before being cut, and with the relative location of the principal axis and of the junction edges indicated. Fig. 7 represents a front elevation of a lens embodying my invention, showing another form which may be employed.

In all multiple focal lenses for spectacles and eye glasses, in which the minor lens member does not have its inner edge, or line demarking the union between the different focal powers, cut horizontally across its principal axis, the change in vision from one focal area to another in the vertical meridian is accompanied by apparent duplication of the object looked at, just as the sight crosses this edge, or line, separating the two focal powers or areas. In all multiple focal lenses that do have the visual edge of the minor lens member cut on the principal focal axis, these minor lens members are located with the principal axis coincident with the geometric center of the major lens, or coincident with the principal axis of the major lens when geometrically decentered. In other cases, the minor lenses have not been cut on their principal axes, nor have their principal axes been located coincident with the geometric center of the major lens. In the present application, I have provided a construction of a multiple focus lens having a plurality of focal powers and composed of members, the principal axis of one of the members being located approximately at the junction edge with the other member and decentric to the principal axis of said member whereby, substantially at the central vertical meridian, doubling of the image is prevented in passing from one focal power to the other, and where the edge of the minor lens is formed straight, there will be no doubling of the image in any vertical meridian, but in the construction where the minor lens is made with a curved edge, there may be slight doubling of the image, if the eye passes from one focal power to the other, at a point laterally removed from the said central vertical meridian, but as the eye, in nearly all instances, in making the vertical excursion, will pass from one focal power to the other, substantially at the central vertical meridian, the doubling of images is overcome at this vertical meridian in that form having a curved junction edge. In the drawings, I have shown a construction and arrangement of members which I have found operates successfully in practice, but the arrangement of the same may be varied and may be combined, as desired, in order to accomplish the desired result.

Similar numerals of reference indicate corresponding parts in the figures.

Referring to the drawings:—1 designates what I term the major lens, and a portion of which serves as the reading lens or as the close vision portion. 2 designates a second lens, which may be termed one of the minor lenses, and which, in the present embodiment, is shown as having a portion thereof or segment cut away, and which is tapered from the upper portion to the lower and is superimposed upon the lens 1 in order that a suitable portion of said minor lens 2, when combined with a portion of the major lens 1, will produce a portion of different focal power, and which may be termed the intermediate vision portion. 3 designates a third lens or member, which may be considered as a second minor lens and which, in the present embodiment, is shown as a lens with a portion or segment thereof removed, and which tapers from the upper portion thereof downwardly to a thin edge and which minor lens 3 is, as here shown, superposed upon the upper portion of the other minor lens 2, in order that the combination or combined effect of the said minor lens 3, the portion of the said minor lens 2, and a portion of the major lens 1, when combined, will produce a vision portion of different focal strength and which, as here shown, will serve as the distance vision portion.

In carrying out my invention, the principal axis of the major lens may be located approximately at the geometrical center thereof, or at some other location not coincident with the principal axis of a minor member, while the principal axis of the minor lens 2 is formed substantially or approximately at the inner junction edge of the same with the major lens 1, and the principal axis of the minor lens 3, which is located approximately or substantially at the inner junction edge thereof with the minor lens 2, and I preferably desire to locate the principal axes of the two minor lenses substantially or approximately at the central vertical meridian. In the drawings, I have indicated the principal axis of the major lens substantially at a point, as 4, the principal axis of the minor lens 2 at a point approximately at 5, and the principal axis of the minor lens 3 approximately at a point 6. By this means, it will be understood that I disclose means to prevent visual dedoublements, and I produce a multiple focal lens which permits the vision to pass up or down along the vertical meridian without causing any doubling of the objects, or so-called "jump" resembling prismatic displacements, at any point on the vertical meridian of the complete lens.

I have, as previously stated, combined the lens members to have their edges placed at a desired distance apart, independent of the principal focal axis and of the geometric center of the major lens member and have thus provided a multiple focal lens which is successful in operation and which is easy of combination, since it will be understood that the members may be ground in such a manner that the lens can be kept quite thin and light, and it is moreover a simple matter to manufacture the same, so that ordinary persons skilled in the art can make the same easily.

As previously stated, while I have shown the lens members combined and mounted in the manners shown, they may be combined in different manners, in order to produce the desired result.

It will now be apparent that I have devised a novel and useful multiple focus lens, which embodies the features of advantage enumerated as desirable in the statement of the invention and the above description, and while I have, in the present instance, shown and described a preferred embodiment thereof which will give in practice, satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A multiple focus lens composed of major and minor lens members, the minor member having its principal axis located approximately at the inner edge and approximately at its central vertical meridian, and the minor member having its principal axis decentric to the principal axis of the major member.

2. A multiple focus lens composed of major and minor lens members, the minor member having its principal axis located approximately at the inner edge and approximately at its central vertical meridian, and the minor member having its principal axis vertically decentric to the principal axis of the major member.

3. A multiple focus lens having a plurality of focal powers, composed of members, the principal axis of one of said members being located approximately at the junction edge with the other member and decentric to the principal axis of said other member.

4. A lens formed with a distance vision portion, an intermediate vision portion and a close vision portion, the principal axes of two of the portions being respectively located approximately at the junction edges of the different vision portions.

5. A lens formed with a distance vision portion, an intermediate vision portion and a close vision portion, the principal axes of two of the portions being respectively located approximately at the junction edges of the different vision portions and approximately at the central vertical meridian.

6. A lens formed with a distance vision portion, an intermediate vision portion and a close vision portion, the principal axes of two of the portions being respectively located approximately at the junction edges of the different vision portions, and decentric to the principal axis of the other portion.

7. A lens formed with a distance vision portion, an intermediate vision portion and a close vision portion, the principal axes of two of the portions being respectively located approximately at the junction edges of the different vision portions, approximately at the central vertical meridian, and decentric to the principal axis of the other portion.

8. A multiple focus lens composed of three lens members, two of said members being incomplete and so mounted upon the third member as to provide a distance vision portion, an intermediate vision portion and a close vision portion, the principal axes of the said incomplete members being located at approximately the inner junction edges thereof.

9. A multiple focus lens composed of a major and two minor lenses, said lenses being suitably located with respect to each other with the principal axes of the minor lenses located approximately at their inner junction edges and decentric to the principal axis of the major lens.

10. A multiple focus lens, composed of major and minor lens members, the major member having its principal axis suitably located, and the minor member having its inner line of junction cut approximately at the point of location of its principal axis and having said line of junction located decentric to the principal axis of said major member.

11. A trifocal lens, formed of one complete or major member and two incomplete or minor members, the major member forming the near-vision portion, the larger of the incomplete members overhanging the said major member and forming therewith the intermediate vision portion, and the smaller of the said minor members overhanging the said other two members and forming with them the distance vision portion, the principal axes of said two minor members being located approximately at their inner junction edges.

12. A multiple focus lens having a plurality of focal powers, composed of major and minor members, the principal axis of said minor member being located approximately at the thinnest portion thereof, and approximately decentric with respect to the principal axis of the major member, when combined.

13. A multiple focus lens, composed of major and minor lens members, the major member having its principal axis suitably located, the minor lens member having its inner line of junction cut horizontally and approximately at the point of location of its principal axis and having said line of junction decentric to the principal axis of said major lens.

14. A multiple focus lens, comprising a major and minor lens member, the major member having its principal axis suitably located, and the minor member having its inner line of junction formed with a curved edge and cut approximately at a given vertical meridian at the point of location of its principal axis and having said line of junction located decentric to the principal axis of said major member.

ANDREW JAY CROSS.

Witnesses:
 THOMAS SPROULL,
 MABEL M. GLASSEY.